H. MIKOREY.
DEVICE FOR THE UNIFORM SPRINKLING OF LIQUIDS.
APPLICATION FILED MAR. 23, 1906.
923,550. Patented June 1, 1909.
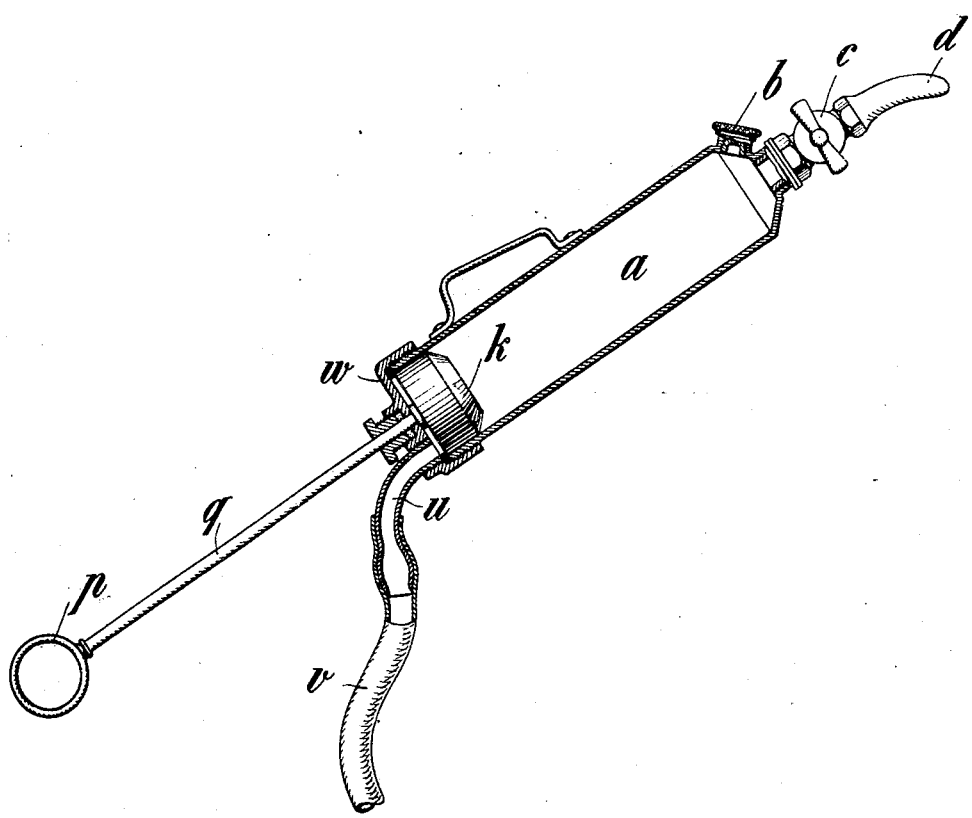

UNITED STATES PATENT OFFICE.

HANS MIKOREY, OF SCHÖNEBERG, NEAR BERLIN, GERMANY, ASSIGNOR TO THE FIRM OF W. GRAAFF & COMPAGNIE, GES. MIT BESCHR. HAFTUNG, OF BERLIN, GERMANY.

DEVICE FOR THE UNIFORM SPRINKLING OF LIQUIDS.

No. 923,550.　　　Specification of Letters Patent.　　　Patented June 1, 1909.

Application filed March 23, 1906. Serial No. 307,753.

*To all whom it may concern:*

Be it known that I, HANS MIKOREY, a civil engineer, and a subject of the German Emperor, and a resident of 13 Wartburgstrasse, in the city of Schöneberg, near Berlin, Kingdom of Prussia and German Empire, have invented a certain new and useful Device for the Uniform Sprinkling of Liquids, of which the following is a specification.

This invention has reference to a device for the uniform sprinkling or distributing of liquids, and in particular of colors and dyes, disinfectants and the like and the improvement is particularly intended to utilize the uniformly acting pressure of an existing water main for the forcing out of the liquid through the spraying or distributing nozzle.

Upon the accompanying drawing the device is shown in longitudinal section by way of example.

The receptacle or container $a$ for the reception of the liquid to be distributed which may for instance consist of a viscid, dust absorbing oil for the distribution upon floors and the like, is made use of in form of a closed vessel which is preferably provided with an ear shaped handle. The filling opening $b$ can be tightly closed. At one end of the device the spraying or distributing nozzle $d$ is provided which may be closed by a controlling cock $c$ and through which the contents of the container are to be ejected to the outside. The nozzle $d$ is so arranged as to be preferably exchangeable.

According to this invention, the interior of the container or receptacle $a$ is connected to a water main by means of a connecting tube $u$ with flexible tube connection $v$. By acting in this manner, the water pressure at disposal, may be utilized for the ejection of the liquid previously filled into the container, by means of a piston $k$, as shown.

By means of a piston rod $q$ with handle $p$ guided in a suitable stuffing-box the piston can be pressed forward most easily for the purpose of ejecting the contents of the receptacle $a$ since the pressure of the water admitted through the conduit $u$ assists to move the piston forward and may be withdrawn after use and after having detached the device from the water conduit, so as to be able to fill a new charge into the device.

The water connecting bottom $w$ of the receptacle or container $a$ is preferably arranged so as to allow of being unscrewed, in order to be able to clean the interior.

What I claim and desire to secure by Letters Patent of the United States is:

A device for the uniform spraying and distribution of liquids such as painting colors and disinfectants by the action of fluid-pressure, comprising a closed liquid-container, a discharge pipe for the painting colors or disinfectants, a piston, an inlet pipe at the rear of the piston, and means for moving the piston by hand.

In witness whereof I have hereunto signed my name this tenth day of March, 1906, in the presence of two subscribing witnesses.

HANS MIKOREY.

Witnesses:
　HENRY HASPER,
　WOLDEMAR HAUPT.